(12) United States Patent
Ahn (10) Patent No.: US 7,221,072 B2
(45) Date of Patent: May 22, 2007

(54) METHOD FOR FABRICATING HELICAL CORE

(75) Inventor: Byung Hwan Ahn, Gimhae-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/302,432

(22) Filed: Dec. 14, 2005

(65) Prior Publication Data

US 2006/0091758 A1 May 4, 2006

Related U.S. Application Data (62) Division of application No. 11/034,740, filed on Jan. 14, 2005, now Pat. No. 7,116,031.

(30) Foreign Application Priority Data

Mar. 3, 2004 (KR) ................. 10-2004-0014311

(51) Int. Cl.
 *H02K 15/00* (2006.01)
 *H02K 1/00* (2006.01)
 *H02K 1/12* (2006.01)
(52) U.S. Cl. .................. 310/216; 310/259; 29/596
(58) Field of Classification Search ............... 310/216, 310/269, 218, 259; 29/596
See application file for complete search history.

(56) References Cited

U.S. PATENT DOCUMENTS

| | | | | |
|---|---|---|---|---|
| 1,920,354 A | * | 8/1933 | Carpenter | ............ 310/259 |
| 3,577,851 A | * | 5/1971 | Detheridge et al. | ............ 29/596 |
| 3,708,706 A | * | 1/1973 | Akiyama et al. | ............ 310/216 |
| 3,842,493 A | | 10/1974 | Ohuchi et al. | |
| 4,102,040 A | * | 7/1978 | Rich | ............ 29/598 |
| 4,364,169 A | | 12/1982 | Kawano et al. | |
| 4,613,780 A | | 9/1986 | Fritzsche | |
| 4,940,913 A | * | 7/1990 | Fritzsche | ............ 310/216 |
| 5,359,249 A | | 10/1994 | Tanaka | |
| 5,382,859 A | * | 1/1995 | Huang et al. | ............ 310/216 |
| 5,457,350 A | | 10/1995 | Sakamaki et al. | |
| 5,489,811 A | | 2/1996 | Kern et al. | |
| 6,181,047 B1 | | 1/2001 | Nitta | |
| 6,313,558 B1 | | 11/2001 | Abukawa et al. | |
| 6,559,572 B2 | | 5/2003 | Nakamura | |
| 6,979,930 B2 | * | 12/2005 | Harada et al. | ............ 310/216 |
| 2004/0119363 A1 | | 6/2004 | Tanaka et al. | |
| 2004/0201304 A1 | | 10/2004 | Niimi et al. | |
| 2005/0073211 A1 | | 4/2005 | Lee | |

FOREIGN PATENT DOCUMENTS

JP 11299136 A * 10/1999

* cited by examiner

*Primary Examiner*—Burton S. Mullins
*Assistant Examiner*—Erik Preston
(74) *Attorney, Agent, or Firm*—Birch, Stewart, Kolasch & Birch, LLP (57) ABSTRACT

A method of fabricating a helical core includes: a stamping step of blanking a pair steel plate cores in two rows from an electrical steel sheet to form a pair of bases confronting each other in a width direction and teeth protruding from each of the bases to alternately cross with each other; providing at least one ejector concavity to the teeth so as to facilitate separation of the steel plate cores blanked in two rows from the electrical steel sheet; and a winding step of helically stacking the steel plate core from a bottom layer to a top layer to configure a multi-layer structure.

6 Claims, 8 Drawing Sheets

METHOD FOR FABRICATING HELICAL CORE

This application is a Divisional of application Ser. No. 11/034,740 filed on Jan. 14, 2005, now U.S. Pat. No. 7,116,031 and for which priority is claimed under 35 U.S.C. § 120; and this application claims priority of Application No. P2004-14311 filed in Korea, Republic of on Mar. 3, 2004 under 35 U.S.C. § 119; the entire contents of all are hereby incorporated by reference.

BACKGROUND OF THE INVENTION

1. Field of the Invention

The present invention relates to a drum type washer, and more particularly, to a helical core configuring a stator of an outer rotor type BLDC motor and fabricating method thereof.

2. Discussion of the Related Art

Generally, a drum type washer performs washing in a manner of rotating a drum, in which a laundry, detergent, and water are put, by a drive force of a motor using friction between the water and the laundry. The drum type washer causes almost no damage to the laundry, prevents raveling of the laundry, and bring about effects of beating and rubbing.

Drum type washers are categorized into an indirect coupling type and a direct coupling type according to a drive system. In the indirect coupling type, a drive force of a motor is indirectly transferred to a drum via a motor pulley and a belt wound of the drum pulley. In the direct coupling type, a rotor of a BLDC motor is directly coupled with a drum to directly transfer a drive force to the drum.

Yet, in the indirect coupling type system that transfers the drive force of the motor to the drum via the motor pulley and the belt wound on the drum pulley instead of transferring the drive force of the motor to the drum directly, energy loss occurs in the process of drive force transfer and considerable noise is generated.

Hence, the direct coupling drum type washer using the BLDC motor is widely used to solve the above problems of the drum type washer.

Figure 1:
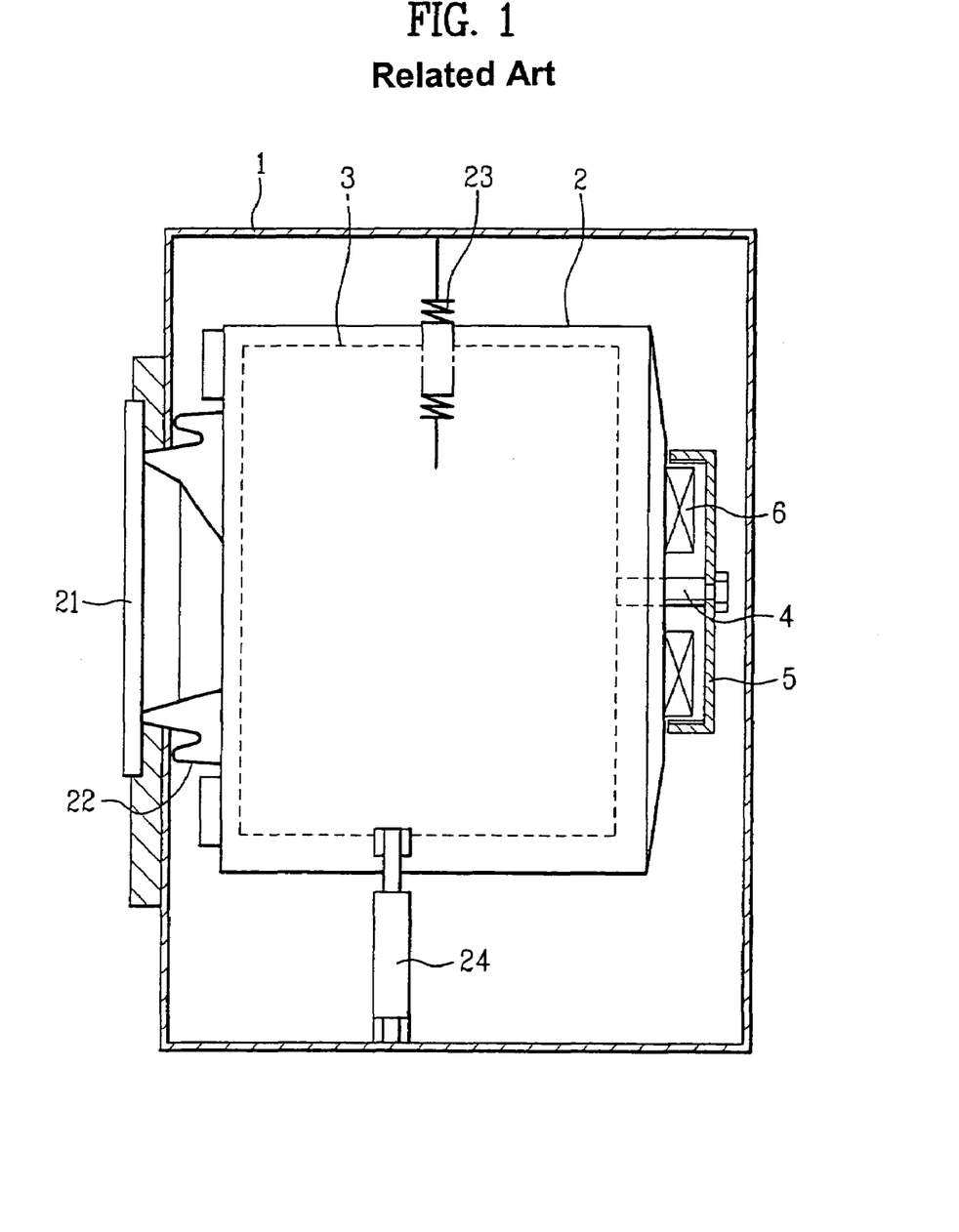
FIG. 1 is a cross-sectional diagram of a direct coupling drum type washer according to a related art.

FIG. 1 is a cross-sectional diagram of a direct coupling drum type washer according to a related art.

Referring to FIG. 1, a tub 2 is provided within a cabinet 1, and a drum 3 is rotatably provided within the tub 2.

A motor is provided to a rear portion of the tub 2. Specifically, a stator 6 is fixed to a rear wall of the tub 2 and a rotor 5 encloses the stator 6 to be coupled to the drum 3 via a shaft.

A door 21 is provided to a front portion of the cabinet 1 and a gasket is provided between the door 21 and the tub 2.

A hanging spring 23 supporting the tub 2 is provided between an inside of a top portion of the cabinet 1 and an upper outer circumference of the tub 2, and a friction damper 24 is provided between an inside of a bottom portion of the cabinet 1 and a lower outer circumference of the tub 2 to attenuate vibration of the tub 2.

Figure 2:
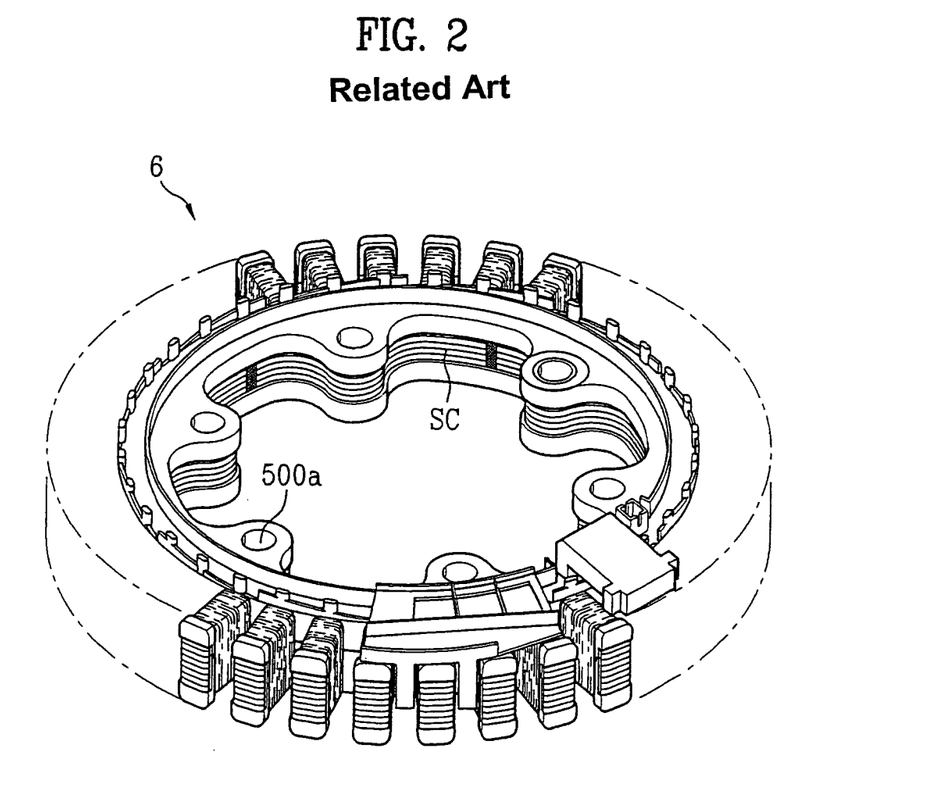
FIG. 2 is a perspective diagram of a stator according to a related art.
Figure 3:
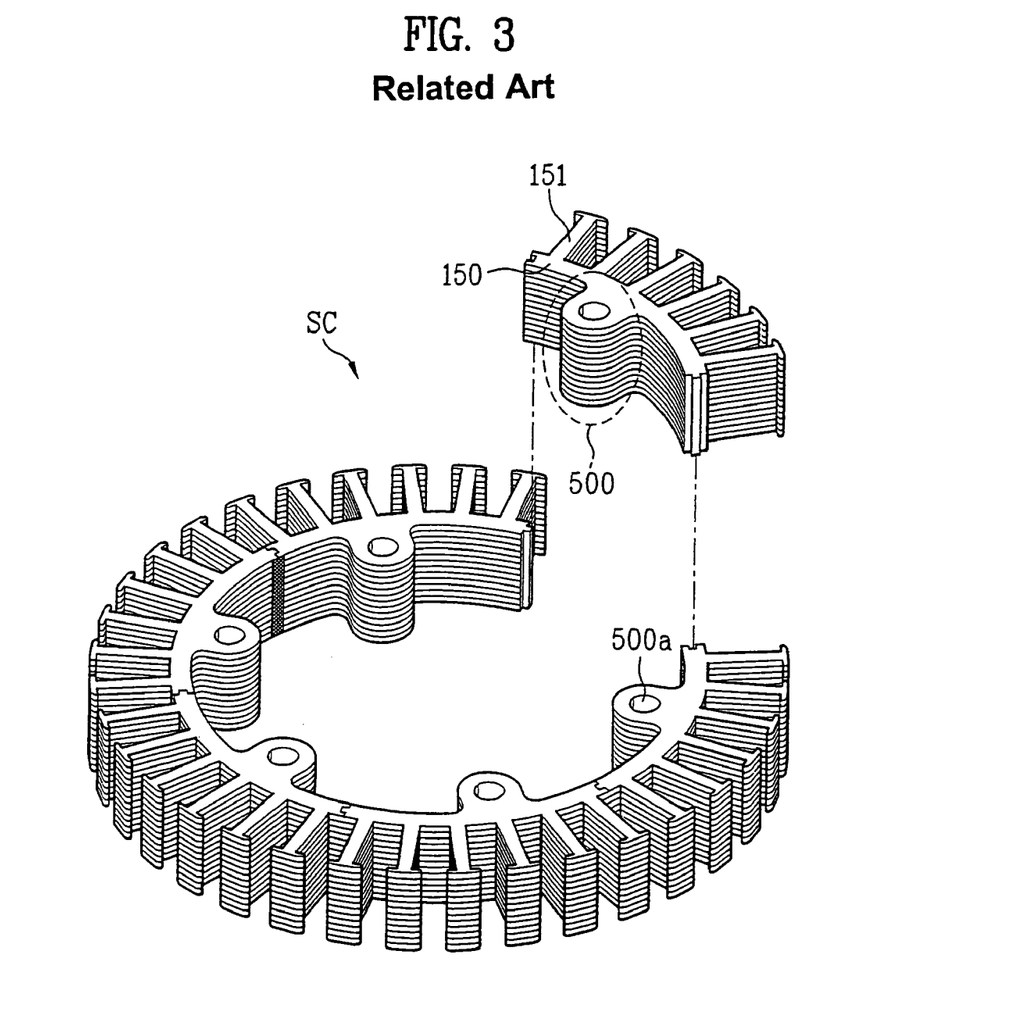
FIG. 3 is a perspective diagram of a sectional core (SC) applied to the stator in FIG. 2.

FIG. 2 is a perspective diagram of a stator in FIG. 1 and FIG. 3 is a perspective diagram of a sectional core (SC) applied to the stator in FIG. 2.

A method of manufacturing a stator core according to a related art is explained as follows.

First of all, a plurality of unit cores are fabricated by a pressing process of a steel plate. In doing so, each of the unit cores consists of teeth 151, a base 150, and a protrusion 500 opposite to the teeth 151 for forming a locking hole 500a. A plurality of the unit cores are stacked to form a plurality of assemblies. And, a plurality of the assemblies are linked in a circumferential direction to complete a stator core.

The protrusion 500 plays a role in standing a locking force of a bolt as well as provides the locking hole 500a necessary for locking a stator to the rear wall of the tub.

Yet, such a method of manufacturing the sectional core SC is very complicated and brings about considerable loss of materials.

Namely, the sectional core SC is manufactured in a manner of preparing one unit core from one steel plate by pressing, stacking a plurality of the processed unit cores to form a plurality of assemblies, and linking a plurality of the assemblies to one another in a circumferential direction. Hence, a considerable amount of the steel plates remains after completion of the pressing to waste the material. Since the protrusion 500 located opposite to the teeth 51 is provided to the unit core, a considerable size of the steel plate is needed to manufacture the unit core. And, the manufacturing method is complicated as well.

Hence, a new stator core playing the same role of the sectional core SC is needed to reduce the material loss and to simplify the corresponding manufacturing process.

SUMMARY OF THE INVENTION

Accordingly, the present invention is directed to a helical core and fabricating method thereof that substantially obviate one or more problems due to limitations and disadvantages of the related art.

An object of the present invention is to provide a helical core and fabricating method thereof, by which a material and weight for fabrication of a core are reduced and by which a fabrication process is simplified.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a helical core according to the present invention has a multi-layer structure configured by helically winding to stack a steel plate core from a bottom layer to a top layer and the helical core includes the steel plate core blanked in two rows from an electrical steel sheet to form a pair of bases confronting each other in a width direction and teeth protruding from each of the bases to alternately cross with each other, wherein to prevent an unwinding of the steel plate core in a direction reverse to a rotation of the steel plate core and a loosening between the stacked layers of the steel plate core in helically winding to stack the steel plate core, an engaging protrusion is provided to each upper or lower surface of the teeth of the steel plate core and an engaging recess is provided to each lower or upper surface of the teeth of the steel plate core to correspond to the engaging protrusion, wherein a recess is provided to the base to reduce stress in winding the steel plate core, and wherein both corners of an end of each of the teeth is chamfered straight or round to form a 'C' shape to reduce vibration and noise generated by cogging torque on driving a motor.

In another aspect of the present invention, a method of fabricating a helical core includes a stamping step of blanking a pair steel plate cores in two rows from an electrical steel sheet to form a pair of bases confronting each other in a width direction and teeth protruding from each of the bases to alternately cross with each other and a winding step of rotating to helically stack the steel plate core from a bottom layer to a top layer to configure a multi-layer structure.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, one embodiment of the present invention is explained in detail with reference to FIGS. 4 to 10 as follows.

Figure 4:
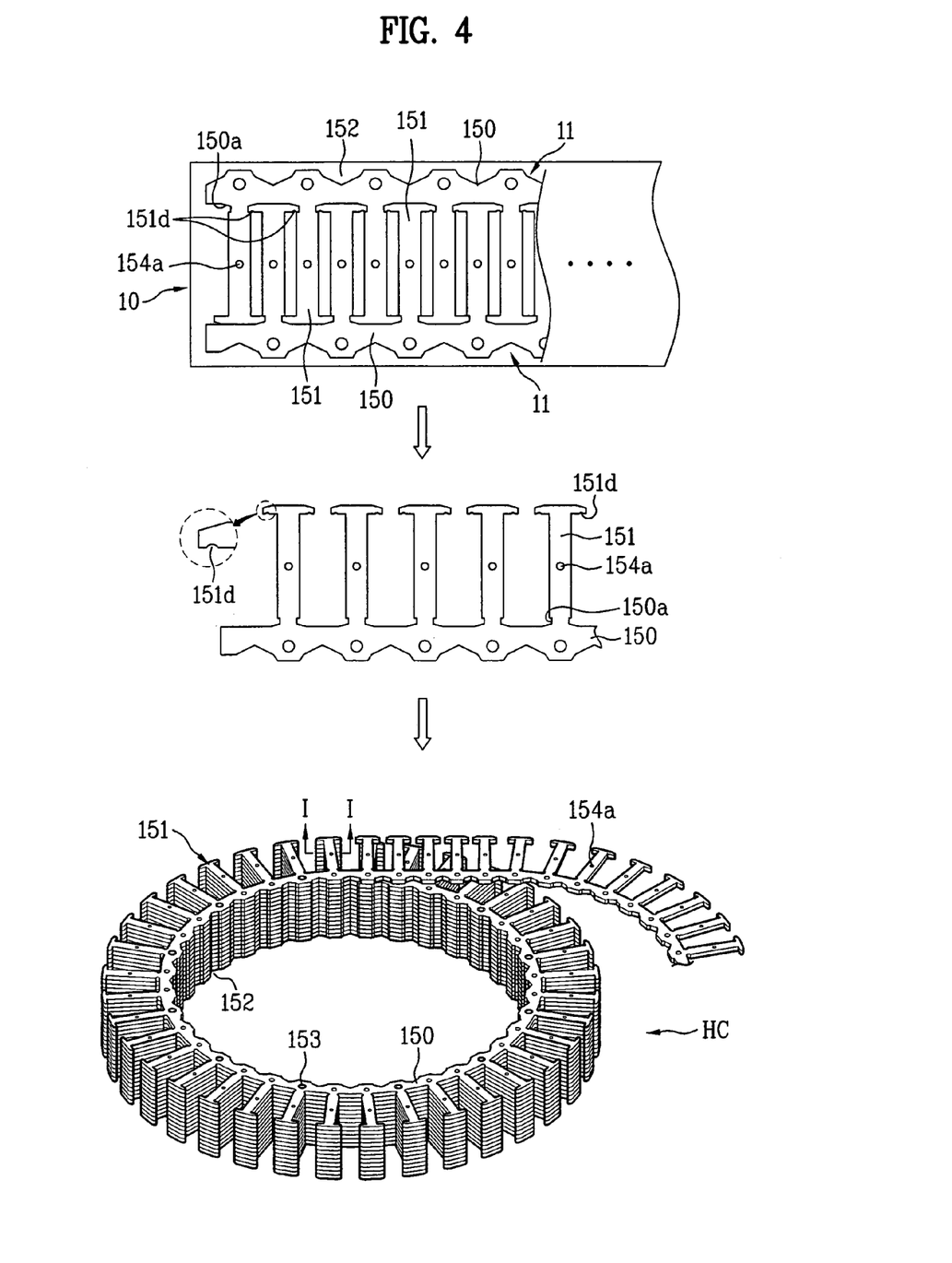
FIG. 4 is a diagram for explaining a process of fabricating a helical core according to the present invention.
Figure 5:
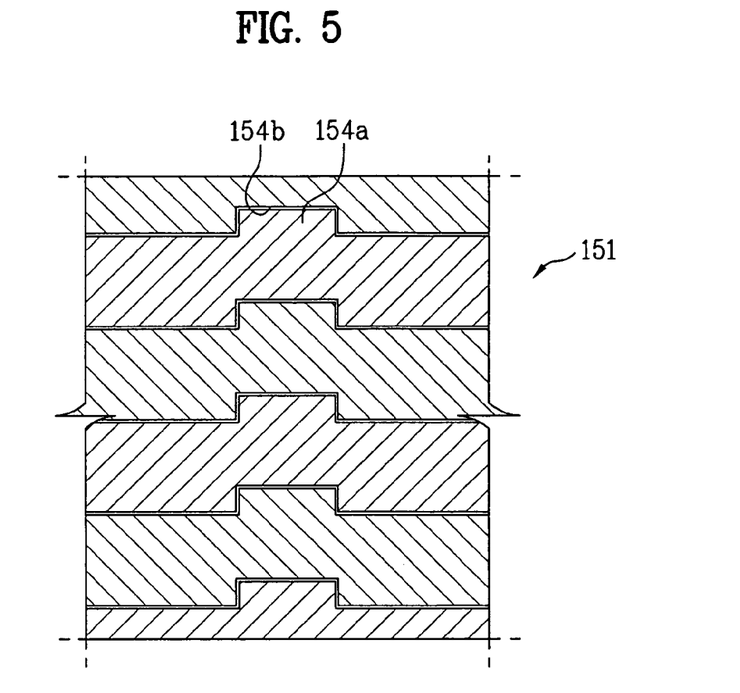
FIG. 5 is a cross-sectional diagram of a major part along a cutting line I—I in FIG. 4.
Figure 6:
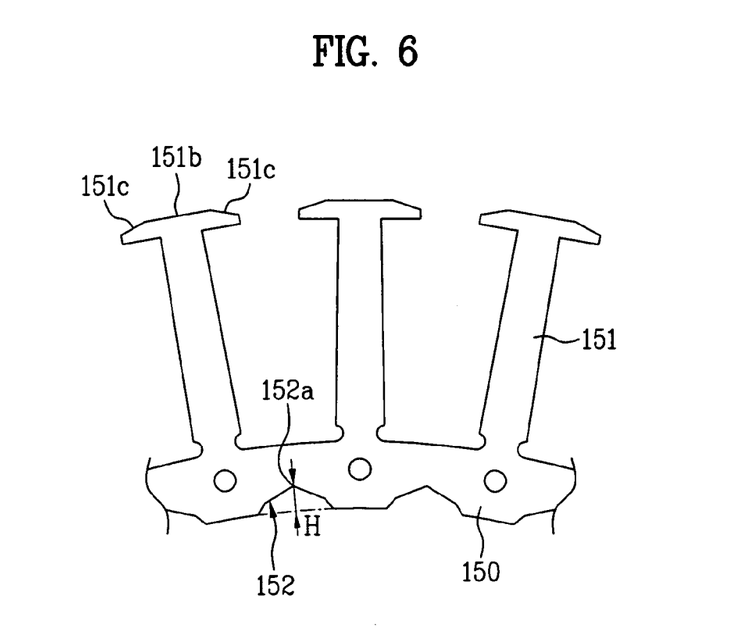
FIG. 6 is a layout of a steel plate core configuring the helical core in FIG. 4.

FIG. 4 is a diagram for explaining a process of fabricating a helical core according to the present invention, FIG. 5 is a cross-sectional diagram of a major part along a cutting line I—I in FIG. 4, and FIG. 6 is a layout of a steel plate core configuring the helical core in FIG. 4.

Referring to FIG. 4, a helical core HC according to the present invention is configured to form a multi-layer structure in a manner of helically winding to stack a steel plate core 11, which is blanked from an electrical steel sheet 10 to form a pair of bases 150 confronting each other in a width direction and teeth 151 protruding from each of the bases 150 to alternately cross with each other, from a bottom layer to a top layer, Namely, a pair of the steel plate cores 11 are arranged on one electrical steel sheet in two rows.

In doing so, to prevent an unwinding of the steel plate core 11 in a direction reverse to a rotation of the steel plate core 11 and a loosening between the layers of the stacked steel plate core 11 in helically winding to stack the steel plate core 11, an engaging protrusion 154a is provided to each upper surface of the teeth 151 of the steel plate core 11 and an engaging recess 154b is provided to each lower surface of the teeth 151 of the steel plate core 11 to correspond to the engaging protrusion 514a.

Alternatively, the engaging protrusion is provided to the lower surface of each of the teeth 151 and the engaging recess is provided to the upper surface of each of the teeth 151.

And, a plurality of recesses 152 are provided to the base 150 between the teeth 151 to facilitate the winding work by reducing stress in winding the steel plate core 11.

In doing so, the recess 152 is formed polygonal so that its depth symmetrically gets lower from a central portion 152a having a maximum depth toward each lateral side portion to meet an edge of the base 150.

And, an overall shape of a tip of each of the teeth 151 of the steel plate core 11 has a 'C' shape by chamfering both corner portions 151c centering on a central portion 151b to reduce vibration and noise generated by cogging torque on driving a motor. In doing so, each of the corner portions 151c can be chamfered straight or round.

Meanwhile, a pair of the steel plate cores 11 are formed by performing blanking on the electrical steel sheet 10 in two rows. In doing so, a notch recess 150a having a same shape of a tip of each of the teeth 151 is formed at the corresponding base 150 confronting the corresponding teeth 151, i.e., the opposite base 150.

Preferably, ejector concaves 151d are formed at the teeth 151 of the steel plate core 11 to facilitate the separation of the steel plate cores 11.

The stacked steel plate core 11 is riveted by rivets 153 penetrating perforated holes provided to the base 150.

And, a winding beginning portion of the stacked steel plate core and a winding end portion of the stacked steel plate core 11 can be welded to prescribed contact portions of the base 150, respectively.

A stator to which the above-configured helical core HC is applicable is explained with reference to FIGS. 7 to 10 as follows.

Figure 7:
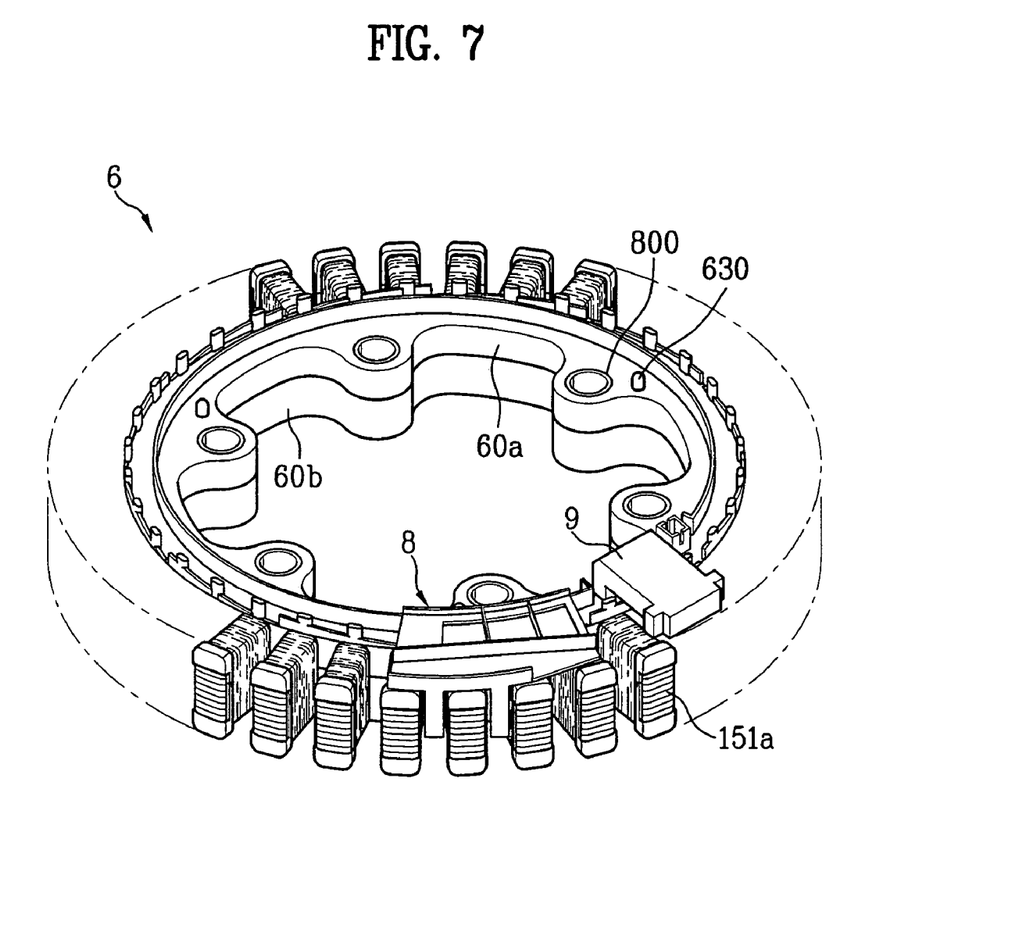
FIG. 7 is a perspective diagram of a stator including a helical core according to the present invention.
Figure 8:
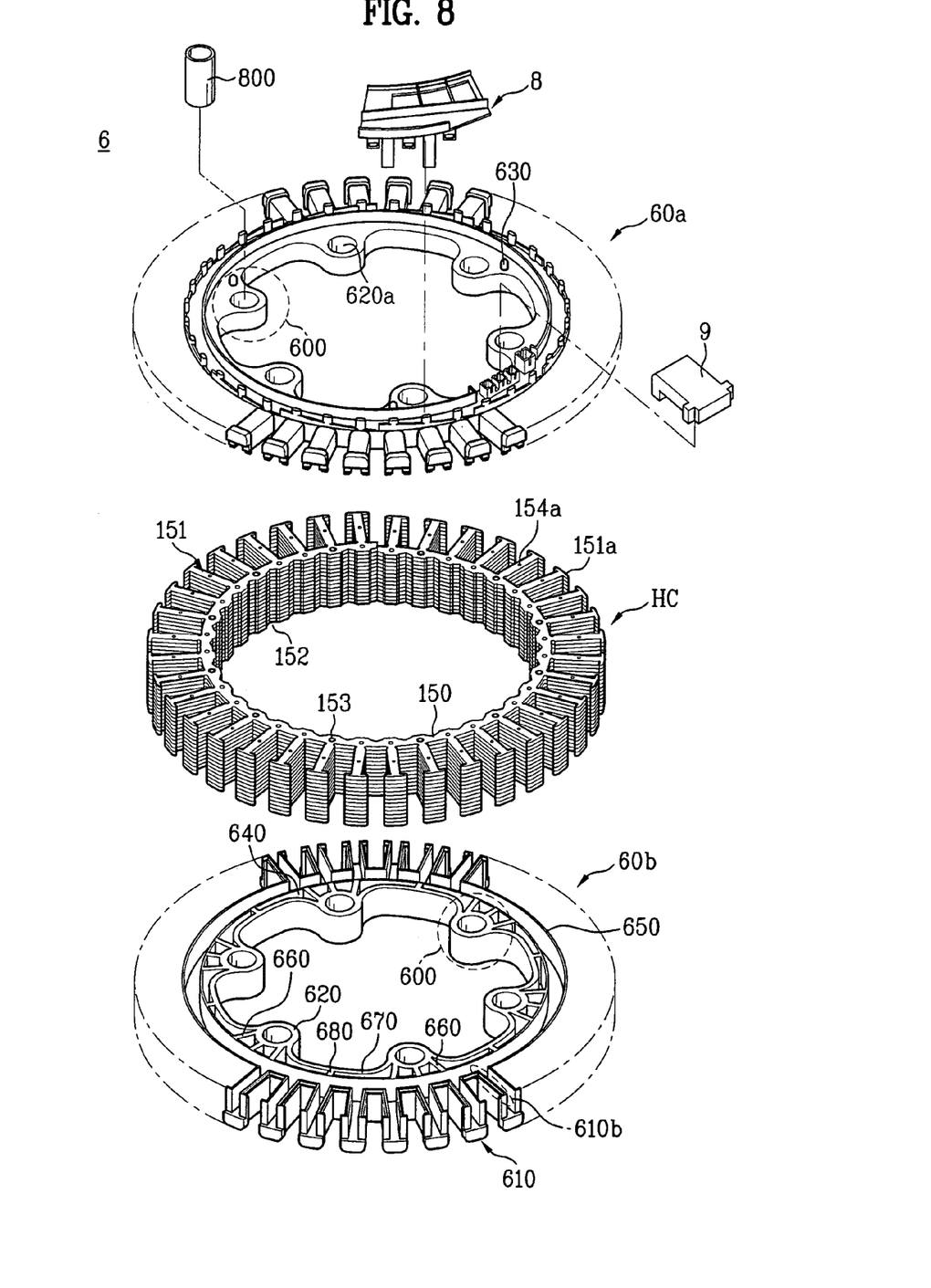
FIG. 8 is a projected perspective diagram of the stator in FIG. 7.
Figure 9:
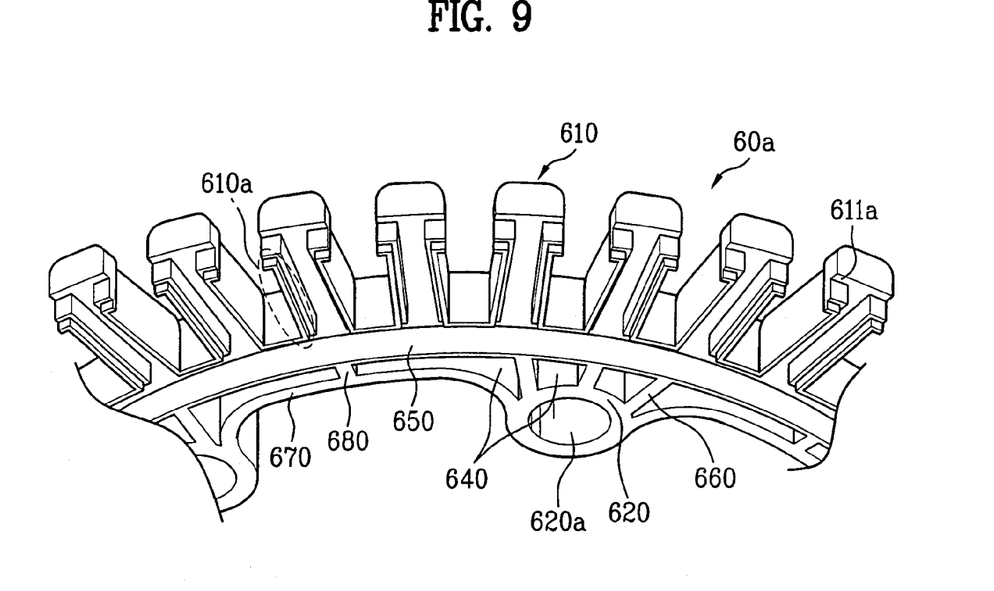
FIG. 9 is a perspective diagram of a backside of an upper insulator in FIG. 5.
Figure 10:
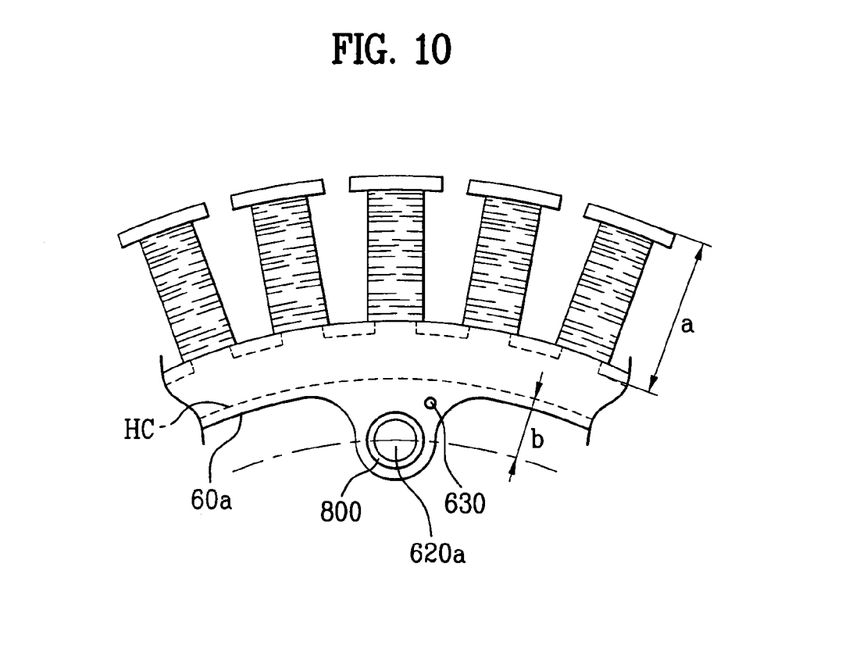
FIG. 10 is a layout of the stator in FIG. 7.

FIG. 7 is a perspective diagram of a stator including a helical core according to the present invention, FIG. 8 is a projected perspective diagram of the stator in FIG. 7, FIG. 9 is a perspective diagram of a backside of an upper insulator in FIG. 5, and FIG. 10 is a layout of the stator in FIG. 7.

Referring to FIGS. 7 to 9, a stator 6, to which the helical core HC according to one embodiment of the present invention is applied, includes the helical core HC, an upper insulator 60a having a shape corresponding to a shape of the helical core HC to enclose an upper part of the helical core HC and formed of an electrically insulating material, a lower insulator 60b having a shape corresponding to the shape of the helical core HC to enclose a lower part of the helical core HC in being assembled to the upper insulator 60a reciprocally and formed of an electrically insulating material, and at least three locking parts 600 built in one body of the upper and lower insulators 60a and 60b and projected from an inside of the helical core HC toward a center of the stator 6 to fix the stator 6 to a fixing side of a tub.

A locking hole 620a is provided to the locking part 600 to fix the stator 6 to a fixing side via a locking member. And, the locking hole 620a is formed by a boss 620 projected from a non-exposed side of the locking part 600.

A support rib 650 is provided in a circumferential direction to insides of non-exposed surfaces of the upper and lower insulators 60a and 60b contacting with top and bottom of the helical core HC, respectively to support a lateral inside of the core.

And, at least one reinforcement rib 660 is provided to the locking part 600 of the upper and lower insulators 60a and 60b to connect the boss 620 configuring the locking hole 620a to the support rib 650, thereby distributing a locking force concentrated on the boss 620 and reinforcing rigidity of the locking part 600.

Moreover, another reinforcement rib 670 is provided to an inner circumference of each of the locking parts 600 of the upper and lower insulators 60a and 60b. And, at least one connecting rib 680 is provided between the reinforcement rib 670 and the support rib 650 supporting the lateral inside of the core to be connected in a radial direction, thereby providing a reciprocal support force.

Stepped portions 610a are provided to both sidewalls of each of the teeth 610 of the upper insulator 60a, respectively. And, stepped portions 610b are provided to both sidewalls of each of the teeth 610 of the lower insulator 60b, respectively. Hence, the stepped portions 610a and 610b engage with each other in assembling the upper and lower insulators 60a and 60b.

In this case, if one of the stepped portions 610a and 610b has a 'ㄱ' shape, the other has a 'ㄴ' shape.

The stepped portions 610a are further provided to tips of both of the sidewalls of each of the teeth 610 of the upper insulator 60a to be approximately vertical to the corresponding sidewalls, respectively. And, the stepped portions 610b are further provided to tips of both of the sidewalls of each of the teeth 610 of the lower insulator 60b to be approximately vertical to the corresponding sidewalls, respectively. Hence, the further-provided stepped portions 610a and 610b engage with each other in assembling the upper and lower insulators 60a and 60b.

Moreover, a loading surface 611a is provided to each end of the teeth 610 of the upper and lower insulators 60a and 60b so that each core shoe 151a of the helical core HC can be loaded thereon.

A location setting projection 630 is provided to a periphery of the locking hole 620a of the locking part 600 to engage with a location setting recess or hole (not shown in the drawing) provided to the fixing side such as a tub and the like.

A cylindrical sleeve 800 fitted in the locking hole 620a is a spring pin having elasticity by a cut portion or a hollow pin enabling its forcible insertion into the locking hole 620a and plays a role as a bushing.

Referring to FIG. 10, the stator 6 according to the present invention includes the at least three locking parts 600 built in one body of the upper and lower insulators 60a and 60b to be projected from the inner circumference of the core in an inner radial direction. If a length of each of the teeth 151 projected from a lateral outside of the helical core HC is set to 'a' and if a distance from a lateral inside of the helical core to a center of the locking hole of the locking part 600 is set to 'b', the locking part 600 is formed to meet a definition of '$a \geq b$'.

Meanwhile, a reference number '8' in FIG. 8 indicates a hole sensor assembly for a motor control and a reference number '9' in FIG. 8 indicates a tap housing assembly for power connection to supply power to the stator side.

A method of fabricating a helical core according to the present invention is explained with reference to FIG. 6 as follows.

Referring to FIG. 6, a method of fabricating a helical core according to the present invention includes a stamping step of blanking steel plate cores 11 in two rows from an electrical steel sheet 10 to form a pair of bases 150 confronting each other in a width direction and teeth 151 protruding from each of the bases 150 to alternately cross with each other and a winding step of rotating to helically stack the steel plate core 11 from a bottom layer to a top layer.

In the stamping step, the steel plate core is formed by performing the blanking on the electrical steel sheet 10 in two rows to provide a notch recess 151d having a same shape of each corner of an end of each of the teeth 151 to the opposite base 150 to the corresponding teeth 151.

In doing so, ejector concaves 151d are formed at the teeth 151 to facilitate a separation of the steel plate cores 11 blanked in two rows from the single electrical steel sheet 10.

Since the steel plate core 11 is formed to have a length equal to that of the electrical steel plate 10 by blanking using a press (not shown in the drawing), the corresponding steel plate core 11 is cut by a length necessary for fabricating one helical core HC after completion of the stamping step.

Meanwhile, the steel plate core 11 cut to the necessary length is then automatically rotated by a winding machine to be helically wound and stacked. In doing so, the steel plate core 11 is wound to have the teeth projected outward and to have a predetermined diameter, thereby configuring a ring shape.

And, the wound and stacked steel plate core 11 is riveted by rivets 153 penetrating perforated holes provided to the base 150.

A winding beginning portion of the riveted steel plate core 11 and a winding end portion of the riveted steel plate core 11 are welded to prescribed contact portions of the base 150, respectively, thereby completing one helical core HC.

Besides, the completed helical core HC is assembled to the upper and lower insulators 60a and 60b in FIG. 5. And, a coil 142 is wound by a predefined number of times on each of the teeth 151 of the helical core HC assembled to the upper and lower insulators 60a and 60b, thereby completing the stator 6 in FIG. 4.

Accordingly, the present invention provides the following effects or advantages.

First of all, the present invention prevents the unwinding of the steel plate core in a direction reverse to a rotation of the helical core and the loosening between the stacked layers of the helical core in helically winding to stack the helical core, thereby facilitating the winding work of the helical core.

Secondly, the present invention saves the material used for the fabrication of the helical core, simplifies the fabrication process, and reduces the vibration and noise generated by the cogging torque of the helical core effectively.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of fabricating a helical core, comprising:
   a stamping step of blanking a pair steel plate cores in two rows from an electrical steel sheet to form a pair of bases confronting each other in a width direction and teeth protruding from each of the bases to alternately cross with each other;

providing at least one ejector concavity to the teeth so as to facilitate separation of the steel plate cores blanked in two rows from the electrical steel sheet; and a winding step of helically stacking the steel plate core from a bottom layer to a top layer to configure a multi-layer structure, wherein the stamping step includes forming each of the teeth to include a tip having a bottom surface facing the base of the steel plate core, and wherein the step of providing the at least one ejector concavity includes forming the at least one ejector concavity having a curved recess in the bottom surface of each of the tips.

2. The method of claim 1, wherein in the stamping step, the steel plate core is formed by performing the blanking on the electrical steel sheet in the two rows to provide a notch recess having a same shape of each corner of an end of each of the teeth to the opposite base to the corresponding teeth.

3. The method of claim 1, wherein the blanked steel plate core is cut to have a predetermined length after completion of the stamping step.

4. The method of claim 1, wherein after completion of the winding step, the stacked steel plate core is riveted by rivets penetrating perforated holes provided to the base.

5. The method of claim 1, wherein a winding beginning portion of the steel plate core and a winding end portion of the steel plate core are welded to prescribed contact portions of the base, respectively.

6. The method of claim 1, wherein the stamping step includes forming each of the teeth to include a main body protruding from the base and include the tip at the top of the main body extending in a direction substantially perpendicular to a protruding direction of the main body protruding from the base, wherein the step of forming the at least one ejector concavity includes forming two ejector concavities respectively at two sides of the bottom surface of the tip divided by the main body of the tooth.

* * * * *